US012336077B2

(12) United States Patent
Spina et al.

(10) Patent No.: US 12,336,077 B2
(45) Date of Patent: Jun. 17, 2025

(54) LED LAMP TO PROMOTE PLANT GROWTH

(71) Applicant: INNOVATION GREEN TECHNOLOGY S.R.L., Catanzaro (IT)

(72) Inventors: Emanuele Spina, Lamezia Terme (IT); Roberto Fabiano, Catanzaro (IT)

(73) Assignee: INNOVATION GREEN TECHNOLOGY S.R.L., Catanzaro (IT)

( * ) Notice: Subject to any disclaimer, the term of this patent is extended or adjusted under 35 U.S.C. 154(b) by 0 days.

(21) Appl. No.: 18/556,658

(22) PCT Filed: Sep. 6, 2021

(86) PCT No.: PCT/IB2021/058098
§ 371 (c)(1),
(2) Date: Oct. 20, 2023

(87) PCT Pub. No.: WO2022/224031
PCT Pub. Date: Oct. 27, 2022

(65) Prior Publication Data
US 2024/0180086 A1   Jun. 6, 2024

(30) Foreign Application Priority Data
Apr. 23, 2021   (IT) .................. 102021000010328

(51) Int. Cl.
*H05B 47/16*   (2020.01)
*F21V 5/00*    (2018.01)
(Continued)

(52) U.S. Cl.
CPC ............. *H05B 47/16* (2020.01); *F21V 5/002* (2013.01); *F21V 5/045* (2013.01); *F21V 23/005* (2013.01);
(Continued)

(58) Field of Classification Search
CPC ......... H05B 47/16; F21V 5/002; F21V 5/045; F21V 23/005; F21V 23/0435;
(Continued)

(56) References Cited

U.S. PATENT DOCUMENTS 9,445,551 B2 * 9/2016 Chapman .............. F21V 15/013
2011/0016785 A1 * 1/2011 Yamada ................ A01G 7/045
47/1.01 R (Continued)

FOREIGN PATENT DOCUMENTS

| CA | 3098719 A1 | 1/2021 |
| DE | 102016015360 B3 | 5/2018 |
| EP | 3244123 A1 | 11/2017 |

OTHER PUBLICATIONS

International search report and written opinion of the International Searching Authority issued in connection with PCT/IB2021/052871.

*Primary Examiner* — Bao Q Truong
(74) *Attorney, Agent, or Firm* — Gallium Law; Wesley Schwie; Isabel Fox

(57) ABSTRACT

LED lamp (100) to promote plant growth and their sanitization comprising: —a casing (101); —a first LED module (104) included in the casing (101) and supported by a support (103) and comprising a plurality of LEDs able to promote a plant growing; —a second LED module (114) included in the casing (101) and supported by the support (103) and comprising a plurality of UCV LED having germicidal action; —a control system (102) for LED lamp switching on-off, and of intensity of light beam emitted by the first and second LED modules (104, 114); —a lens (110) comprising an optical module (105); —a remote management system configured for programming the switching on-off, timer and luminous intensity of LED lamp (100).

9 Claims, 4 Drawing Sheets

(51) Int. Cl.
- *F21V 5/04* (2006.01)
- *F21V 23/00* (2015.01)
- *F21V 23/04* (2006.01)
- *F21Y 105/18* (2016.01)
- *F21Y 113/00* (2016.01)
- *F21Y 113/13* (2016.01)
- *F21Y 115/10* (2016.01)

(52) U.S. Cl.
CPC ....... *F21V 23/0435* (2013.01); *F21Y 2105/18* (2016.08); *F21Y 2113/13* (2016.08); *F21Y 2113/30* (2023.05); *F21Y 2115/10* (2016.08)

(58) Field of Classification Search
CPC .............. F21Y 2105/18; F21Y 2113/13; F21Y 2115/10; F21Y 2113/30
See application file for complete search history.

(56) References Cited

U.S. PATENT DOCUMENTS

| | | |
|---|---|---|
| 2013/0076239 A1 | 3/2013 | Chung et al. |
| 2017/0311553 A1* | 11/2017 | Dobrinsky .............. A01G 9/20 |
| 2020/0068809 A1* | 3/2020 | Ko ......................... A01G 9/249 |
| 2021/0084828 A1* | 3/2021 | Hunter ................... H05B 45/20 |
| 2021/0085812 A1* | 3/2021 | Kim ........................ C02F 1/325 |

* cited by examiner

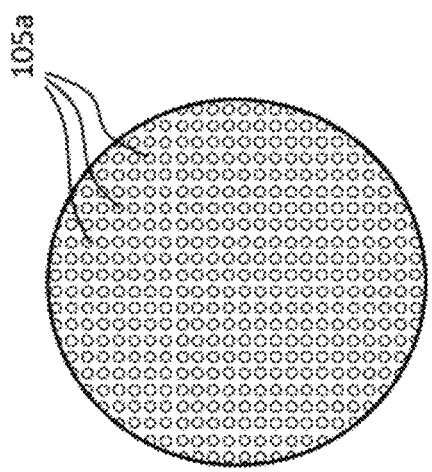
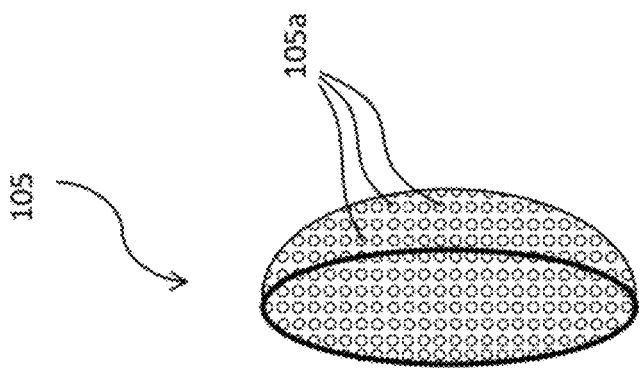
Fig. 4a
Fig. 4b
Fig. 4

LED LAMP TO PROMOTE PLANT GROWTH

The present invention relates to a LED lamp to promote plant growth and their sanitization.

In particular, the present invention relates to a LED lamp configured to promote plant growth and their sanitization, of the type used for example in greenhouse cultivation.

As is known, chlorophyll photosynthesis is the chemical process that allows plants to grow and survive. Through this process, the light energy is absorbed by the pigments of the plant and transmitted to specific pairs of chlorophyll to activate the production reaction of organic substances, mainly vital carbohydrates, starting from atmospheric carbon dioxide and metabolic water.

Chlorophyll photosynthesis basically occurs in two phases: the light dependent phase (or luminous phase) and the carbon fixation phase. While the carbon fixation phase consists in the incorporation of carbon dioxide into organic compounds thanks to the ATP obtained from the luminous phase, in the latter, the molecules of the dominant chlorophyll A selectively absorb the light energy in the red portions and blue-violet of the visible spectrum, through a series of adjuvant pigments, respectively necessary for flowering and growth.

Although only these two portions of light energy are useful, the daylight spectrum extends continuously from ultraviolet to infrared, including between these two extremes, the spectrum of visible light composed of violet, blue, green, yellow and red; spectrum that also fluctuates according to atmospheric conditions, geographical position and time of day. This explains why in recent years artificial lighting systems for plant cultivation have become widespread, containing radiation mainly composed of the spectral bands of red and blue.

An LED light device for cultivation is described in WO2009/141287A1 which particularly relates to a modular LED system comprising a frame having a plurality of LED light emitting diodes of at least two different colors to generate light within a spectrum of colors, said LEDs being mounted on a plate, preferably thermally conductive, equipped with cooling means. The system comprises a processor for controlling an amount of electric current supplied to the plurality of LEDs, so as to determine the color of the light generated, and a translucent element associated with the LEDs to decrease or increase the angle of diffusion of the light emitted by each LED. The LED system is suitable as a plant lighting system to complement natural light.

A further example is described in WO2018206767 (A1) which relates to a light emitting device comprising: a plurality of light emitting diodes (LEDs) suitable for the emission of a photon wave with an emission wavelength $\lambda$ less than 270 nm and with an energy greater than an optical gap $Eg=hc/X$, the plurality of LEDs comprises a confinement device adapted to confine and amplify the photon wave.

However, although these known systems have contributed to the development and optimization of plant cultivation, they are unable to optimize plant growth and flowering and do not have a bactericidal and sanitizing action.

The purpose of the present invention is to provide a LED lamp to promote plant growth and their sanitization which guarantees an optimal distribution of the light beam, with precise and remote control of the emitted light energy and therefore having characteristics such as to overcome the limits which still affect the systems previously described with reference to the prior art.

According to the present invention, a LED lamp to promote plant growth and their sanitization is provided, as defined in claim 1.

For a better understanding of the present invention, a preferred embodiment is now described, purely by way of non-limiting example, with reference to the attached drawings, in which:

FIGS. 4a-4b show respectively frontal and three-dimensional schematic views of the LED lamp to promote the plant growth and their sanitization, according to the invention.

Figure 1:
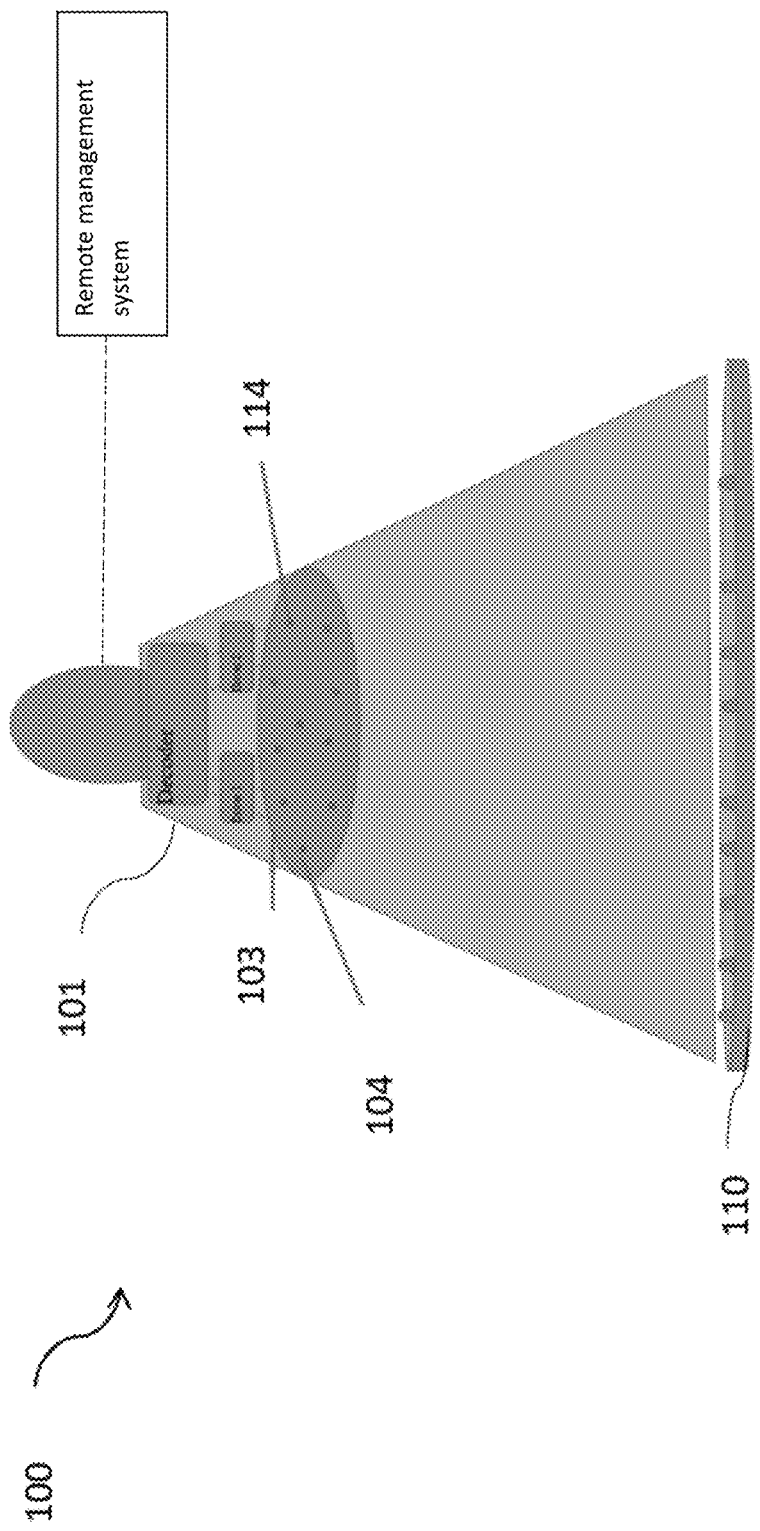
FIG. 1 shows a schematic view of a LED lamp to promote plant growth and their sanitization, according to the invention.

With reference to these figures, and in particular to FIG. 1, a LED lamp 100 to promote plant growth and their sanitization is shown, according to the invention.

More specifically, the LED lamp 100 to promote plant growth and their sanitization comprises:
- a casing 101 with screw connection;
- a first LED module 104 comprised in the casing 101 and supported by a support 103 and comprising a plurality of LEDs having the action of promoting the growth of a plant;
- a second LED module 114 comprised in the casing 101 and supported by the support 103 and comprising a plurality of UVC LEDs with germicidal action;
- a control system 102 of the switching on, switching off and intensity of the light beam emitted by the first and second LED module 104, 114;
- an optical module 105 covering the casing 101, the control apparatus 102, the support 103 and the first and second LED modules 104, 114.

According to one aspect of the invention, the LED lamp 100 comprises a remote management system (encoder) for programming the ignition, shutdown, timer, and light intensity of the LED lamp 100 itself.

According to an aspect of the invention, the casing 101 is a conical support having, for example, attachment e27, sliding attachment or other type of known system for powering from the electrical network.

According to an aspect of the invention, the LED lamp 100 further comprises two power supplies, PCBs supporting the first growth LED module 104, a second support for housing the second LED module 114 of UVC LEDs, an eye lens 110 dragonfly with lenses suitable for mixing the luminous flux.

According to an aspect of the invention, the lens 110 is placed to cover the casing 101, the support 103 and the first and second LED modules 104, 114, and comprises an optical module 105.

According to an aspect of the invention, the control system 102 is a decoder configured to control switching on and off and intensity of the luminous flux.

The LED lamp 100 comprises, according to one aspect of the invention, an intelligent timer system. In use, the intelligent timer system gives the command to the encoder to send the signal to the decoder that powers the drivers, such switching can only be for the growth LEDs 104 and/or the UVC LEDs 114. All this, regulated by a logic of switching on and off and regulation and interpolation between the two PCBs, first growth LED module 104 and second UVC LED module 114 which favors flowering growth and sterilization/sanitization of plants.

The light produced by the plurality of LEDs breaks on the internal part of the lens 110 and of the internal reflecting screen, resulting in an optimal mixing of the light, this uniformity guarantees homogeneous irradiation.

According to one aspect of the invention, the remote management system (encoder) is configured for programming the ignition, shutdown, duration (timer) and light intensity of the lamp 100.

According to an aspect of the invention, the LED lamp 100 comprises a conical support with a reflective internal surface configured to obtain a homogeneous mixing and irradiation.

Figure 2:
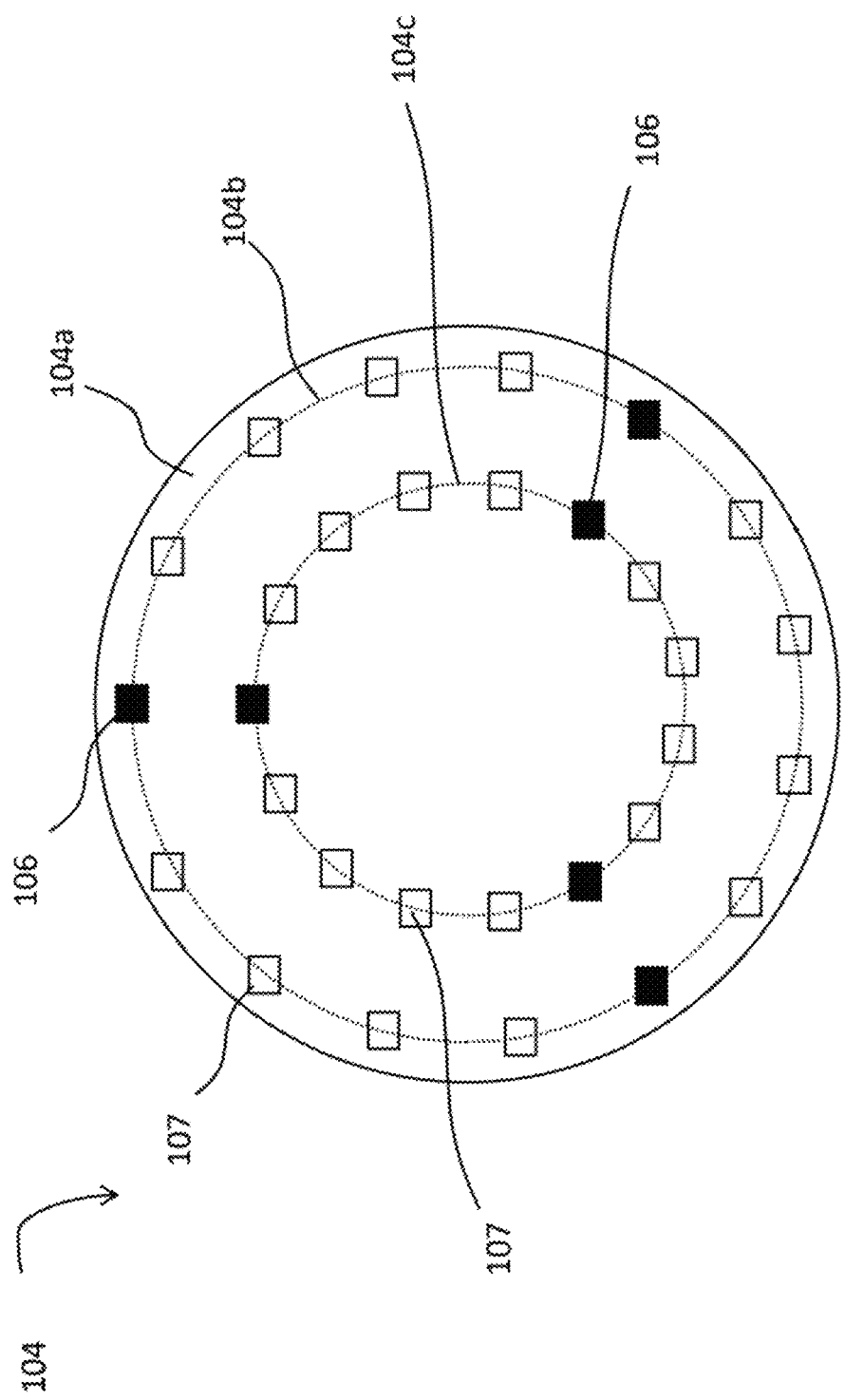
FIG. 2 shows a two-dimensional schematic view of a first LED module of the LED lamp to promote the plant growth and their sanitization, according to the invention.

According to an aspect of the invention, the first LED module 104, shown in detail in FIG. 2, comprises a circular PCB support 104a on which are placed a first group of LED sources 104b arranged on a first peripheral circumference of the PCB support 104a and a second group of LED sources 104c arranged on a second circumference internal to the first, so that the first group of LED sources 104b is concentric with the second group of LED sources 104c.

In particular, according to another aspect of the invention, both the first group of LED sources 104b and the second group of LED sources 104c comprise a plurality of blue light LEDs 106 and a plurality of red light LEDs 107. More specifically, preferably according to the invention, the groups of LED sources 104b and 104c each consist of 3 blue light LEDs 106 and 12 red light LEDs 107, arranged in such a way that every 4 red light LED 107 there is 1 blue light LED 106, with a 4:1 ratio.

Figure 3:
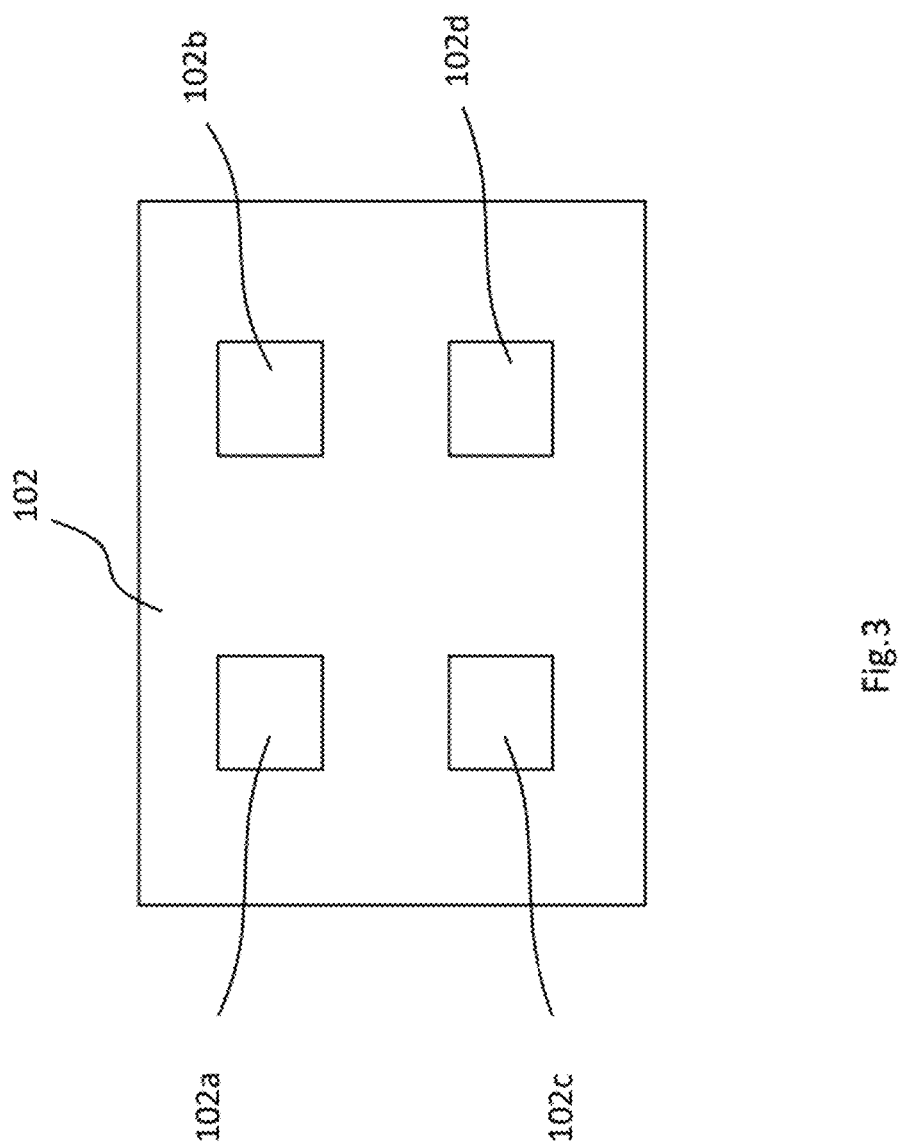
FIG. 3 shows a block diagram of a light beam control apparatus of the LED lamp to promote plant growth and their sanitization, according to the invention.

According to an aspect of the invention, as shown in FIG. 3, the control apparatus 102 comprises a transformer 102a, a rectifier 102b, a voltage stabilizer 102c and a control circuit 102d.

During operation, the transformer 102a performs a first adaptation of the mains electrical voltage to the supply voltage of the device 100 and, in particular, lowers the voltage level from 220 Volts to approximately 58 Volts. Subsequently, through the rectifier 102b, for example consisting of a diode bridge and a series of electric capacitors, the alternating current is transformed into direct current while through the stabilizer 102c the voltage is lowered and stabilized from 58 Volt to 53.5 Volt, that is, the operating value of the LEDs 106 and 107. At this point, the control circuit 102d, for example constituted by ferromagnetic, blocks the current value that passes through it at an optimal value, for example 0.28 Ampere.

Advantageously according to the invention, the control apparatus 102 is configured to provide the LEDs 106 and 107 with an electrical power such that the LEDs 106, 107 always absorb the same current value.

Advantageously according to the invention, the apparatus 102 is configured to modulate the light beam emitted by the LEDs 106, 107 so that it has a constant frequency and light intensity.

Advantageously according to the invention, the apparatus 102 is configured to protect the LEDs 106, 107 from any overheating.

Furthermore, the control apparatus 102 is configured to allow an alternation of red light and blue light optimized to promote growth but within the limits of too early growth which would lead to an anomalous shape of the plant, for example, obtaining a shape too long of the plant or too open. In fact, the red favors the production of growth hormone and the blue favors the strengthening of the same and a larger flower with more marked colors.

According to an aspect of the invention, the optical module 105 is configured to concentrate and homogenize the light beam emitted by the LEDs 106 and 107. In particular, as shown in FIGS. 4a-4b, the optical module 105 comprises a plurality of micro modules 105a configured to divide the light beams emitted by the LEDs 106 and 107 into a plurality of micro-light beams which, consequently, are mixed together inside the module 105. The module 105, in fact, manages to appropriately combine the light beams emitted directly by the LEDs 106, 107 with the light beams reflected inside the casing 101. Therefore, the lamp 100 according to the invention is able to guarantee the emission of a light beam without variations in frequency, temperature and light intensity.

Another advantage of the LED lamp 100 to favor the growth of plants and their sanitization according to the invention, consists in the fact that it is able to generate a light beam in the right combination of red and blue spectrum for the stimulation of chlorophyll photosynthesis and therefore through the red spectrum it favors the production of the growth hormone of the plant and through the blue spectrum the strengthening and flowering of larger dimensions and with stronger colors.

Moreover, advantageously, the LED lamp 100 according to the invention favors the process of photosynthesis and therefore the production of growth hormone of a plant, allowing a better flowering and in any case favoring the complete life cycle of the plant, in fruit trees, in fourth range vegetables, etc.

Another advantage of the LED lamp to promote the growth of plants and their sanitization according to the invention is that, at the same time and in a controllable and programmable way, it is able to improve the growth of plants and to guarantee their sanitization from bacteria and pathogens.

Finally, the LED lamp to promote the growth of plants and their sanitization according to the invention is easy to use and low cost.

Finally, it is clear that modifications and variations can be made to the LED lamp to promote plant growth and their sanitization described and illustrated here without departing from the protective scope of the present invention, as defined in the attached claims.

The invention claimed is:

1. LED lamp (100) to promote plant growth and their sanitization comprising:
   a casing (101);
   a first LED module (104) included in the casing (101) and supported by a support (103) and comprising a plurality of LEDs able to promote a plant growing;
   Characterized in comprising:
   a second LED module (114) included in the casing (101) and supported by the support (103) and comprising a plurality of UVC LED having germicidal action;
   a control system (102) for LED lamp switching on, LED lamp switching off, and of intensity of light beam emitted by the first and second LED modules (104, 114);
   a lens (110) covering the casing (101), the support (103) and the first and second LED module (104, 114), comprising an optical module (105); and
   a remote management system configured for programming the switching on, switching off, timer and luminous intensity of LED lamp (100).

2. LED lamp (100) according to claim 1, characterized in comprising a control apparatus of the light beam emitted by the first LED module (104), said control apparatus comprising a transformer (102a), a rectifier (102b), a voltage stabilizer (102c) and a control circuit (102d).

3. LED lamp (100) according to claim 1, characterized in that said casing is a conical support.

4. LED lamp (100) according to claim 1, characterized in comprising two power supplies, a PCB support for the first LED module (104), a second support for housing the second LED module (114) of UVC LEDs, and in that said lens (110) is a dragonfly eye lens configured for luminous flux mixing.

5. LED lamp (100) according to claim 1, characterized in comprising an intelligent system of timer configured to give to an encoder a command to send a switching on signal to a decoder which powers at least one driver, said switching on being relative to the first LED module (104) and/or to the second LED module (114).

6. LED lamp (100) according to claim 2, characterized in that said first LED module (104) comprising a circular support (104a) housing a first group of LED sources (104b) arranged on a first peripheral circumference of the circular support (104a) and a second group of LED sources (104c) arranged on a second circumference internal to the first peripheral circumference, said first group of LED sources (104b) and said second group of LED sources (104c) comprising a plurality of blue light LEDs (106) and a plurality of red light LEDs (107).

7. LED lamp (100) according to claim 6, characterized in that the first and second group of LED sources (104b, 104c) each comprise at least one blue light LED (106) arranged every four red light LEDs (107).

8. LED lamp (100) according to claim 6, characterized in that said control apparatus is configured to set the light beam emitted by the LEDs (106, 107) at constant frequency and light intensity.

9. LED lamp (100) according to claim 6, characterized in that the optical module (105) comprises a plurality of micro modules (105a) configured to divide the light beams emitted by the LEDs (106, 107) into a plurality of light micro beams.

* * * * *